(12) United States Patent
Iwasaki

(10) Patent No.: US 6,514,674 B1
(45) Date of Patent: Feb. 4, 2003

(54) METHOD OF FORMING AN OPTICAL ELEMENT

(75) Inventor: Yuichi Iwasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,380

(22) Filed: Mar. 8, 2000

(30) Foreign Application Priority Data

Mar. 11, 1999 (JP) ............................................. 11-065641

(51) Int. Cl.[7] ................................................. G02B 5/18
(52) U.S. Cl. .......................... 430/321; 216/24; 216/26; 216/41; 216/51; 359/642; 359/571; 359/572; 359/575
(58) Field of Search ................ 216/24, 26, 2, 216/12, 41, 51; 430/321, 311, 325; 355/18, 67; 359/642, 571, 572, 575

(56) References Cited

U.S. PATENT DOCUMENTS

| | | | | |
|---|---|---|---|---|
| 4,340,276 A | * | 7/1982 | Maffitt et al. | 350/164 |
| 5,240,558 A | * | 8/1993 | Kawasaki et al. | 156/659.1 |
| 5,399,238 A | * | 3/1995 | Kumar | 156/643 |
| 5,858,853 A | * | 1/1999 | Shishiguchi et al. | 438/398 |
| 5,943,571 A | | 8/1999 | Schaefer et al. | 438/257 |

FOREIGN PATENT DOCUMENTS

| | | |
|---|---|---|
| JP | 62-69407 | 3/1987 |
| JP | 62-69408 | 3/1987 |
| JP | 64-38701 | 2/1989 |
| JP | 3-266460 | 11/1991 |
| JP | 10-112440 | 4/1998 |

OTHER PUBLICATIONS

Wilson, et al. "The Optical Properties of 'Moth Eye' Anti-reflection Surfaces", *Optica Acta*, vol. 29, No. 7, 1982; pp. 993–1009.

Chen, et al. "Diffractive Phase Elements Based on Two–dimensional Artificial Dielectrics", *Optical Society of America*, vol. 20, No. 2, 1995; pp. 121–123.

Pawlowski, et al. "Antireflection–coated Diffractive Optical Elements Fabricated by Thin–film Deposition", *Optical Engineering*, vol. 33, No. 11, 1994; pp. 3537–3546.

* cited by examiner

Primary Examiner—John A. McPherson
(74) Attorney, Agent, or Firm—Fitzpatrick, Cella, Harper & Scinto

(57) ABSTRACT

The back surface of a BOE (binary optical element) having a binary optical structure formed thereon is coated with a resist film. Chromium is then deposited on the BOE by means of electron beam evaporation so as to form an island structure with an island size of about 50 nm and an island-to-island distance of about 80 nm. The BOE is then etched with an etchant to a depth of 55 nm using the island structure as a mask thereby forming a pillar-shaped microstructure. The island structure used as the mask is removed by means of wet etching using an etchant, and the resist film on the back surface of the BOE is removed using a resist remover. Thus, a microstructure is obtained which has antireflection capability allowing suppression of reflection to a level of 1% or less for a wavelength of 248 nm.

18 Claims, 14 Drawing Sheets piller size/period

METHOD OF FORMING AN OPTICAL ELEMENT

BACKGROUND OF THE INVENTION

1. Field of the Invention

The present invention relates to a method of forming a microstructure, and more particularly to a method of a forming a microstructure on a surface of a binary optical element (BOE) such as a diffraction grating having a step shape in cross section. The present invention also relates to a method of producing an optical element having such a microstructure.

2. Description of the Related Art

In recent years, the BOE has been receiving attention as a technique for producing a high-precision diffractive optical element. BOEs are step-shaped diffractive optical elements approximating diffractive optical elements having a blazed shape in cross section. For example, a diffractive optical element 1 having a blazed shape in cross section shown in FIG. 17A may be approximated by a diffractive optical element 2 having a step structure as shown in FIG. 17B.

The surfaces of transmissive optical elements are generally covered with an antireflection film for suppressing reflection of light. In the case of refractive lenses, they have a smooth surface and thus it is easy to form an antireflection film. In contrast, the surface of BOEs is not smooth. A technique of forming an antireflection film on the non-smooth surface of a BOE is disclosed in a paper entitled "Antireflection-coated diffractive optical elements fabricated by thin-film deposition" (Pawloski and B. Kuhlow, Opt. Eng. 33(11), 3537–3546, (1994)).

In the method disclosed in this paper, an antireflective film 12 is formed by depositing a material m for forming an antireflective film using ion beam sputtering at a right angle from above onto a substrate 11 having a step structure, as shown in FIG. 18. When an antireflection film 12 is formed on an element having a microstructure such as a BOE, it is desirable that the antireflection film be formed, as shown in FIG. 18, only on step surfaces 11a perpendicular to incident light parallel to the optical axis.

Another antireflection technique is disclosed in a paper entitled "The optical properties of 'moth eye' antireflection surfaces" ( S. J. Wilson and M. C. Hutley, Optica. Acta. Vol. 29, No. 7,993–1009(1982)). In this technique, a microstructure is formed on the surface of a BOE so that the refractive index in a region near the surface continuously varies in a direction perpendicular to the surface thereby achieving antireflection capability. More specifically, a resist film 32 is coated on a substrate 31, and the resist film 32 is exposed to argon or krypton ion laser beams L1 (with a wavelength, λ, of 458 nm or 351 nm) interfering with each other in X and Y directions, as shown in FIG. 19A, thereby forming, as shown in FIG. 19B, micro projections 33 whereby antireflection capability is achieved.

Still another antireflection technique is disclosed in a paper entitled "Diffractive phase elements based on two-dimensional artificial dielectrics" (F. T. Chen and H. G. Craighead, Opt. Lett., Vol. 20, No2, 121–123 (1995)). In this technique, an aluminum film 42 with a thickness of 100 nm is first formed on a quartz substrate 41, and then a resist film 43 is coated on the surface of the aluminum film 42, as shown in FIG. 20A. The resist film 43 is then exposed to an electron beam with a diameter of 70 nm using an electron beam exposure technique. Thereafter, the resist film 43 is developed to obtain a pattern such as that shown in FIG. 20B. The aluminum film 42 is then etched by means of reactive ion etching (RIE) using the resist film 43 as a mask as shown in FIG. 20C. Thereafter, as shown in FIG. 20D, the quartz substrate 41 is etched using the aluminum film 42 and the resist film 43 as a mask. The aluminum film 42 and the resist film 43 are then removed. Thus, a pillar-shaped microstructure 44 having antireflection capability is obtained as shown in FIG. 20E.

However, when an antireflection film is formed on a micro step-structure such as a BOE using the sputtering technique shown in FIG. 18, the micro steps cause the resultant antireflection film to be nonuniform in thickness as shown in FIG. 21. Furthermore, the antireflection film 52 is also deposited on the side wall 51a of each step. Because the side wall is parallel to incident light, the film deposited on the side wall causes degradation in the antireflection capability.

Furthermore, in this antireflection technique using an antireflection film, it is required to select a proper film material having an optimum refractive index depending on the wavelength of light. When light has a wavelength shorter than 300 nm, the optical characteristics of most film materials are not good for such a short wavelength. More specifically, in such a short wavelength range, most film materials have large absorption indexes and cannot provide a large refractive index difference. Even when antireflection is achieved, the allowable wavelength range is narrow. Furthermore, no good film forming techniques for practical production are available. Besides, sufficiently high reliability is not achieved.

In the technique shown in FIG. 19, when a microstructure is produced by means of exposure to laser beams interfering with each other, there is a possibility that interference of laser beams occurs to an insufficient degree which results in nonuniformity in a resist pattern serving as an antireflection structure. The nonuniformity in the resist pattern results in degradation in antireflection capability. Furthermore, because the resist film used to form the antireflection structure is made of an organic material which absorbs light with a wavelength in a certain range, antireflection capability is achieved only in a limited wavelength range. The organic resist film also has problems with reliability and durability.

On the other hand, in the technique of forming an antireflection microstructure on the surface of a substrate by exposing a resist film to an electron beam and developing it as shown in FIG. 20, if the surface of the substrate, on which the resist film is formed, has a microstructure, then defocus occurs in the exposure process and thus the resultant resist pattern becomes poor in uniformity. As a result, the size of circular-shaped pillars or holes formed in the antireflection structure becomes nonuniform. Another problem of the electron beam exposure technique is that a long time is required to form a pattern over a large area, because exposure is performed using only a single beam. Thus, this technique is not suitable for mass production.

SUMMARY OF THE INVENTION

It is an object of the present invention to provide a method of forming a microstructure and a method of producing an optical element without encountering the problem or problems described above.

It is another object of the present invention to provide a technique of forming a microstructure on the surface of an optical element, at a desired location using the same material as that of the optical element thereby imparting high antireflection capability or reflection enhancement capability to the optical element.

According to an aspect of the present invention, there is provided a method of producing a microstructure, comprising the steps of: forming a mask on a surface of a substance, the mask including a nucleus or an island structure formed via nucleation in a process in which a thin film is formed; and etching the surface of the substance via the mask. According to another aspect of the present invention, there is provided a method of producing an optical element, comprising the steps of: forming a mask on a surface of a substrate, the mask including a nucleus or an island structure formed via nucleation in a process in which a thin film is formed; and forming a microstructure having antireflection capability or reflection enhancement capability by etching the surface of the substrate via the mask.

DESCRIPTION OF THE PREFERRED EMBODIMENT

The present invention is described in further detail below with reference to preferred embodiments in conjunction with FIGS. 1–16.

Figure 1A:
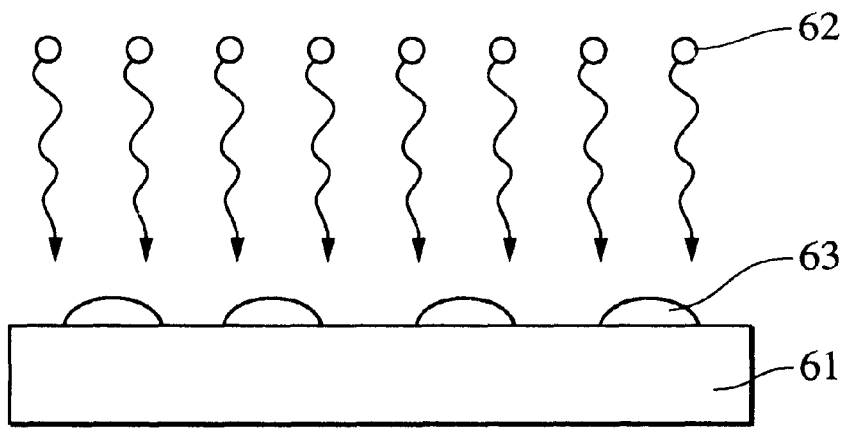
FIG. 1 is a schematic diagram illustrating a method of forming a microstructure according to the present invention.

FIG. 1 is a schematic diagram illustrating a method of forming a microstructure. In FIG. 1A, an island structure 63 including islands is formed on a substance 61 by means of sputtering, evaporation, ion plating, or CVD. Herein, islands are formed via nucleation in a process in which a thin film is formed of a substance 62. Nuclei grown to a diameter of about 1 to 10 nm are generally called islands.

Figure 1B:
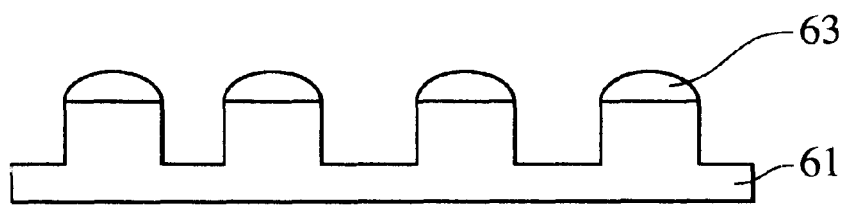
Figure 1C:
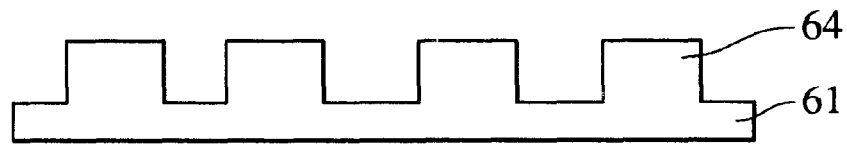

Thereafter, as shown in FIG. 1B, the surface of the object 61 is etched using the island structure 63 as a mask. After completion of the etching, the island structure 63 used as the etching mask is removed. Thus, a microstructure 64 is formed on the surface of the object 61, as shown in FIG. 1C. In this technique, as can be understood from the above description, the island size and the island distribution density of the microstructure 64 are determined by the material 62, the growth method, and the growth conditions of the island structure 63. The geometrical shape of the microstructure 64 is determined by the etching method.

Figure 2:
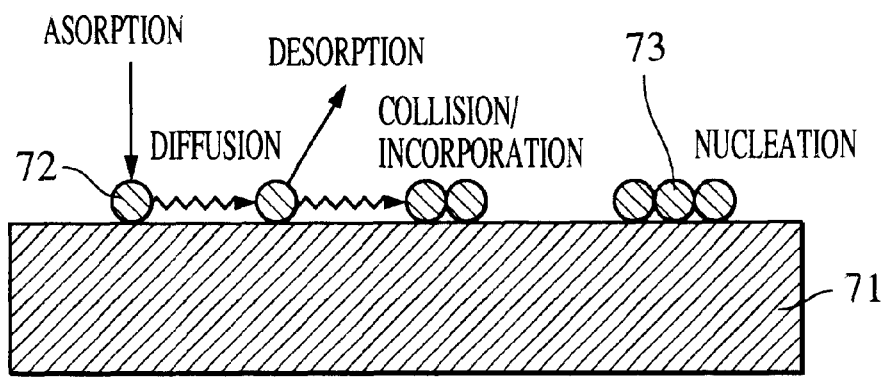
FIG. 2 is a schematic diagram illustrating a process in which an island structure is formed.

FIG. 2 illustrates the process of forming the island structure 63 shown in FIG. 1A. In the various film forming techniques described above, most atoms 72 or molecules adsorbed on the surface of the substrate 71 are diffused over the surface of the substrate 71. However, atoms 72 in a lone state are unstable, and they desorb when a certain period of time has elapsed. If an atom 72 meets another atom or a group of atoms and they coalesces together, then nucleation occurs. Nuclei 73 coalesce with other atoms 72 or other nuclei 73 into greater nuclei and finally grow to islands 63 as shown in FIG. 1A. If islands 63 further coalesce with one another to greater islands, bridges are formed among them. Further growth results in formation of a mesh structure. Then, a channel structure with a width of about 50 Å to 200 Å is obtained. After that, the structure goes into a state in which there are a great number of pin holes. Finally, pin holes disappear, and a continuous film is obtained.

The island size and the island density of the island structure 63 can be controlled by properly selecting the combination of the film material and the film forming method of forming the island structure 63 via a process in which nuclei 73 grow into islands, and also properly selecting the film forming conditions such as the film forming time and the film forming temperature. For example, island structures 63 formed by means of sputtering have a small island size and a large island density. On the other hand, island structures 63 formed by means of evaporation have a large island size and a low island density. In the case where the film is formed using an ion plating technique or an ion beam sputtering technique, the growth of nuclei 73 depends on the ion beam irradiation intensity. Thus, the island density and island size of the island structure 63 can be controlled by adjusting the ion beam irradiation intensity.

Figure 3A:
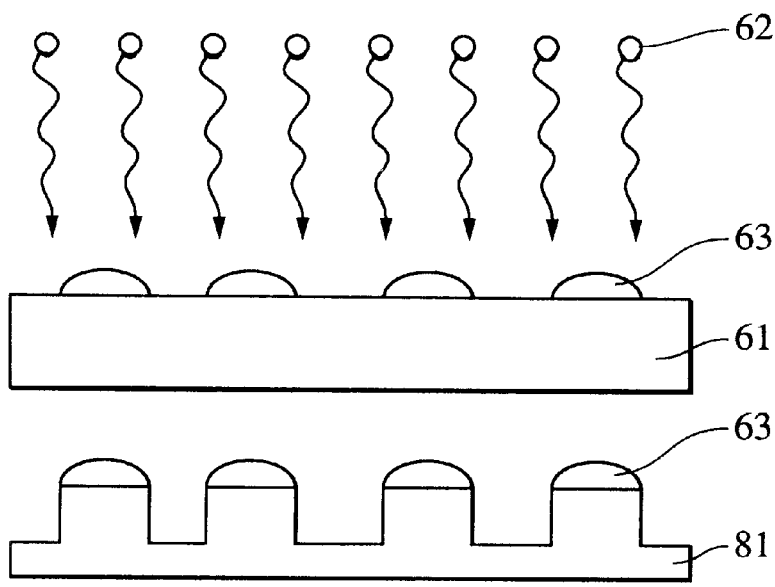
FIG. 3 is a schematic diagram illustrating another method of forming a microstructure according to the present invention.
Figure 3B:
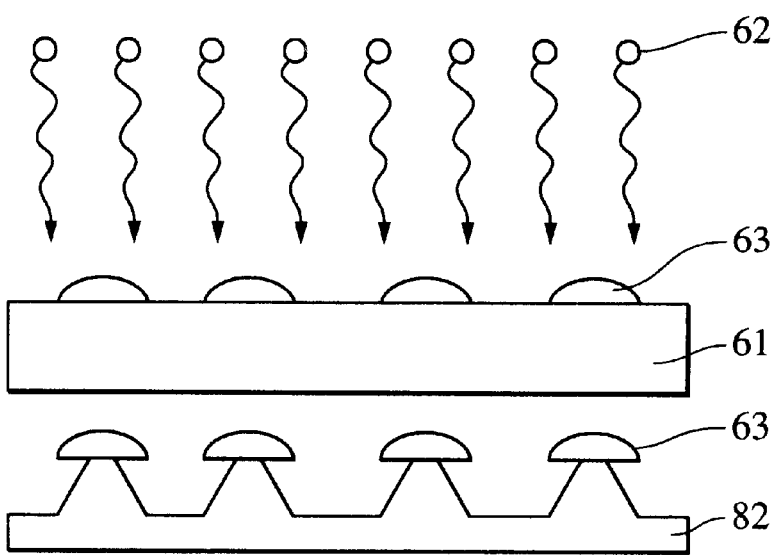

The geometric shape of the microstructure 64 shown in FIG. 1C can be controlled by properly selecting an etching technique. In the case where reactive ion etching (RIE) having high anisotropy is employed, a microstructure 81 consisting of pillars with a size which are uniform in a vertical direction is obtained as shown in FIG. 3A. On the other hand, if an etching process having high isotropy is employed, undercutting occurs below the islands, and the resultant microstructure 82 has a circular cone shape such as that shown in FIG. 3B. The height of islands of the microstructure 81 or 82 can be controlled by properly adjusting the etching rate and the etching time. In the case where a wet etching process is used, the angle of the side wall of circular cone-shaped islands can be controlled by properly adjusting the concentration of an etchant.

Figure 4:
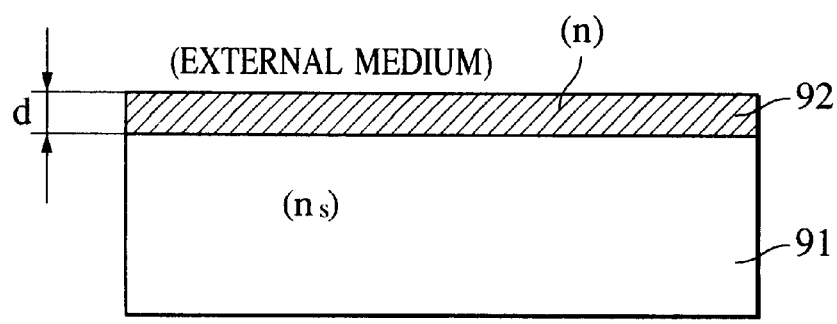
FIG. 4 is a schematic diagram illustrating conditions required for antireflection.

FIG. 4 illustrates conditions required for antireflection. To impart antireflection capability or reflection enhancement capability to the microstructure 64, 81, or 82 described above, the following conditions represented by equations (1) and (2) should be met. That is, when a single-layer antireflection film 92 with a thickness d and a refractive index n is formed of a transparent material on a substance 91 with a refractive index $n_s$ conditions required for antireflection at boundary between air and the antireflection film are given by the following equations (1) and (2):

$$nd=(1/4+m/2)\lambda(m=0, 1, 2, \ldots .) \quad (1)$$

$$n=(n_s)^{1/2} \quad (2)$$

Herein, equations (1) and (2) are called phase condition and amplitude condition, respectively. To achieve antireflection, the material used should be meet these conditions represented by equations (1) and (2).

By forming a microstructure on the surface of a substance, it is possible to achieve a similar effect to that obtained by disposing the single-layer antireflection film 92 with an intermediate refractive index between the external medium and the substance 91, thereby reducing or completely eliminating reflection at the surface of the substrate. More specifically, in the structure shown in FIG. 4, when the substance 91 has a refractive index $n^s=1.51$ for a wavelength $\lambda$, the single-layer antireflection film 92 can be replaced with an antireflection microstructure having a refractive index n=1.23 and having same thickness d as that of the single-layer antireflection film 92.

Figure 5:
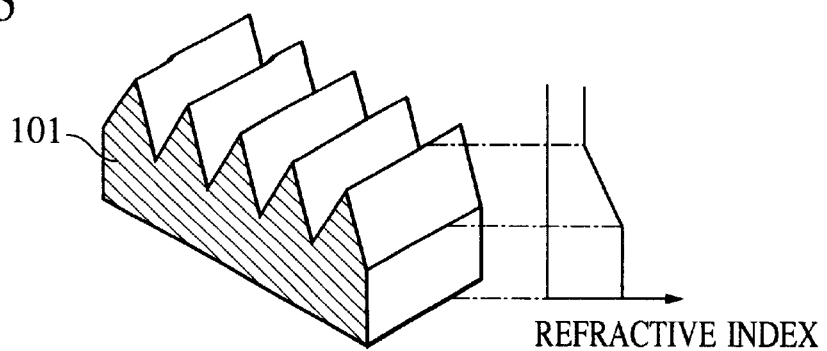
FIG. 5 is a cross-sectional view illustrating an example of an antireflection structure.

If the substance surface region 101 is formed into a triangular structure in cross section as shown in FIG. 5, the refractive index gradually varies with the position in the triangular structure in a depth direction, and thus antireflection capability can be obtained. Two-dimensional periodic structures such as a pyramid-shaped microstructure generally have high antireflection capability as is known in a "moth eye".

Figure 6:
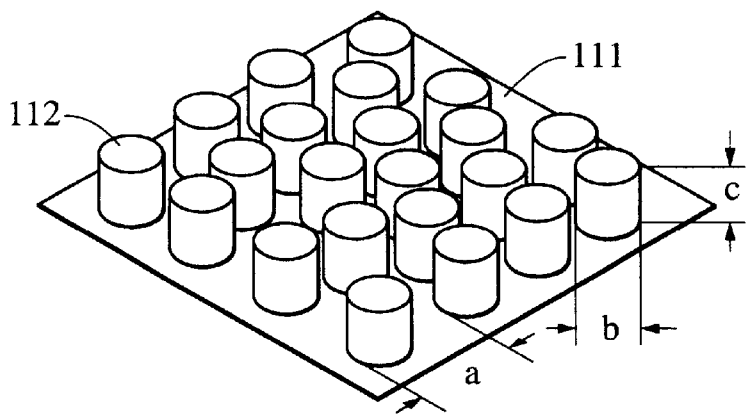
FIG. 6 is a cross-sectional view illustrating another example of an antireflection structure.
Figure 7:
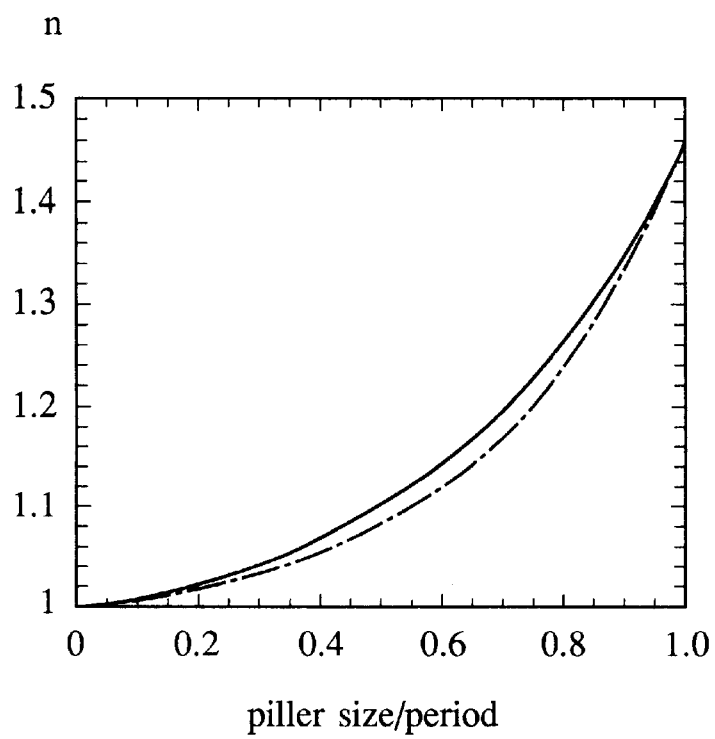
FIG. 7 illustrates the relationship between the structure and the refractive index of an antireflection microstructure.

FIG. 6 is a schematic diagram illustrating an antireflection microstructure formed on the surface of a substance using the microstructure forming method according to the present invention such that the above-described optical conditions for antireflection are satisfied. In this specific example, a pillar-shaped microstructure 112 is formed on a substance 111 using an anisotropic etching technique. In this case, the antireflection conditions are determined by the refractive index of the substance 111 and parameters of the microstructure 112 shown in FIG. 6 including the pillar-to-pillar distance a, the pillar size b, the pillar height c, and the fill factor f. FIG. 7 illustrates the relationship between the fill factor f and the refractive index of the antireflection microstructure. The pillar-to-pillar distance a and the pillar size b of the pillar-shaped microstructure 112 can be determined from equation (2) in conjunction with a calculation described in the paper entitled "Diffractive phase elements based on two-dimensional artificial dielectrics" cited above. The pillar height c of the microstructure 112 can be determined from equation (1).

Figure 8:
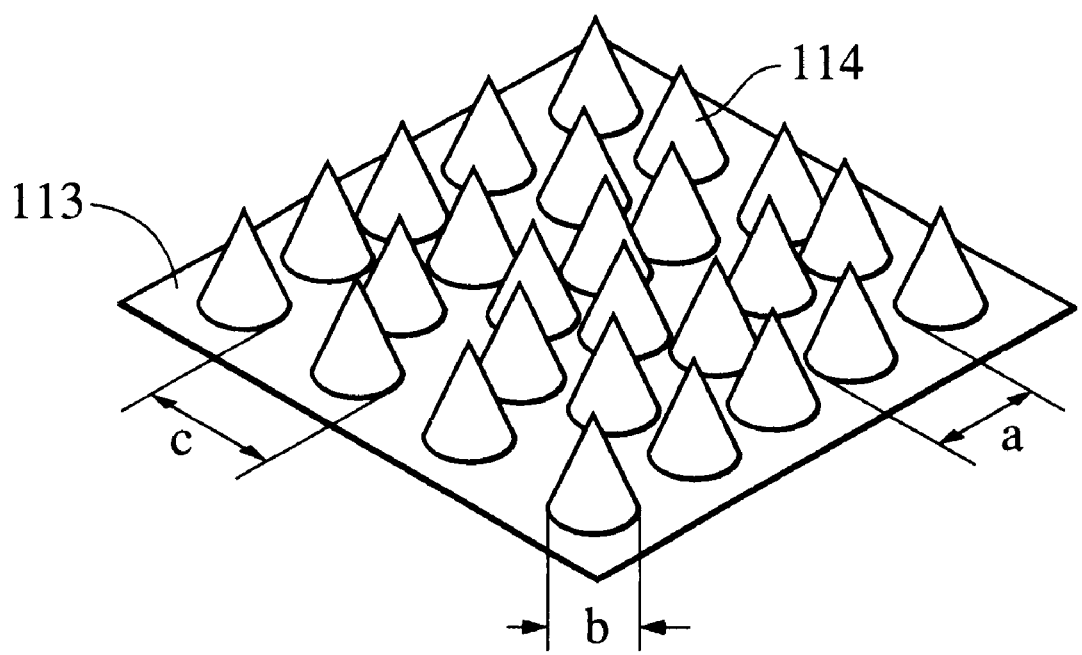
FIG. 8 is a cross-sectional view illustrating still another example of an antireflection structure.

FIG. 8 illustrates a circular cone-shaped antireflection microstructure 114 formed on a substance 113 using an anisotropic etching technique according to the present invention. In this case, the diffractive index n of the substance 113 and the period a and the height c of the microstructure 112 required for antireflection can be determined by the conditions described in the paper entitled "The optical properties of 'moth eye' antireflection surfaces" cited above. That is, the following conditions should be met:

$$\lambda<2.5c \quad (3)$$

$$\lambda>na \quad (4)$$

From equations (3) and (4), period a, size b, and height c of the microstructure 114 can be determined. By controlling the process of forming the island structure and the etching process in accordance with the above parameters determined, the microstructure 114 can be formed on the substance 113 thereby achieving a desired antireflection capability.

Figure 9A:
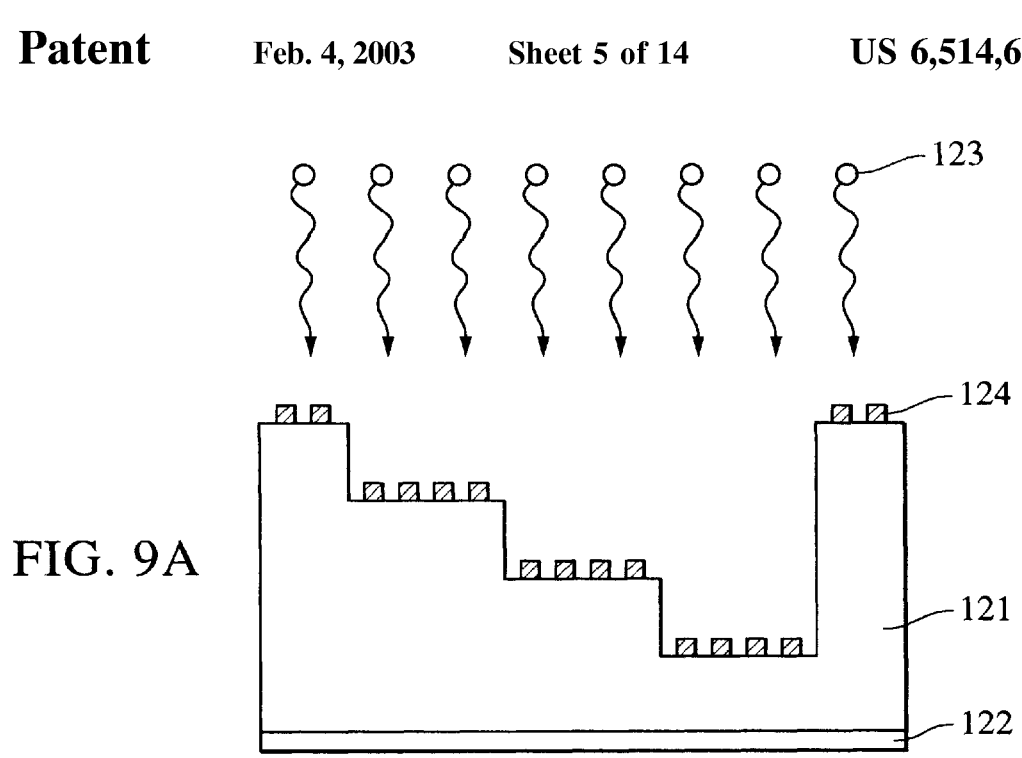
FIG. 9 is a schematic diagram illustrating a method of forming an antireflection microstructure according to a first embodiment of the present invention.
Figure 9B:
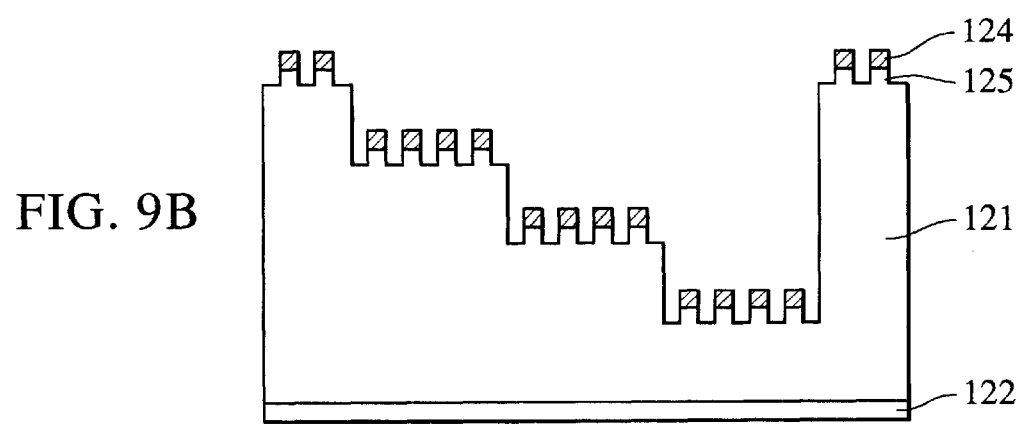
Figure 9C:
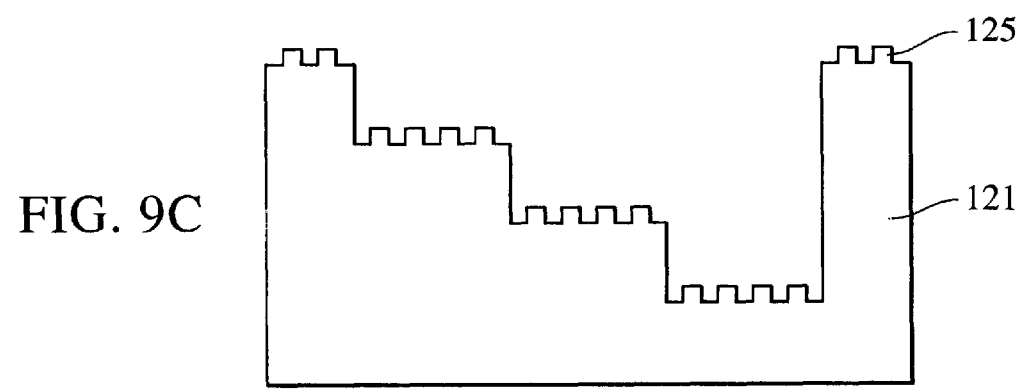
Figure 10A:
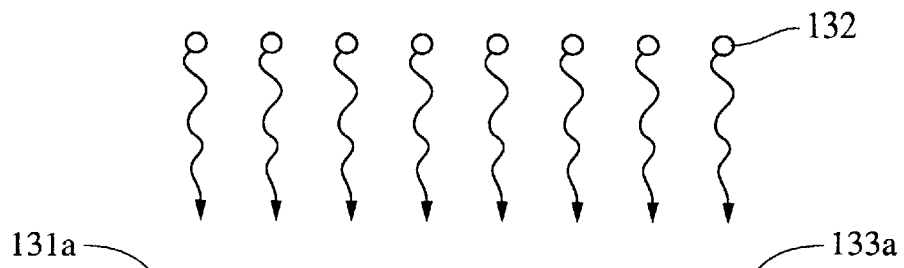
FIG. 10 is a schematic diagram illustrating a method of forming an antireflection microstructure according to a second embodiment of the present invention.
Figure 10B:
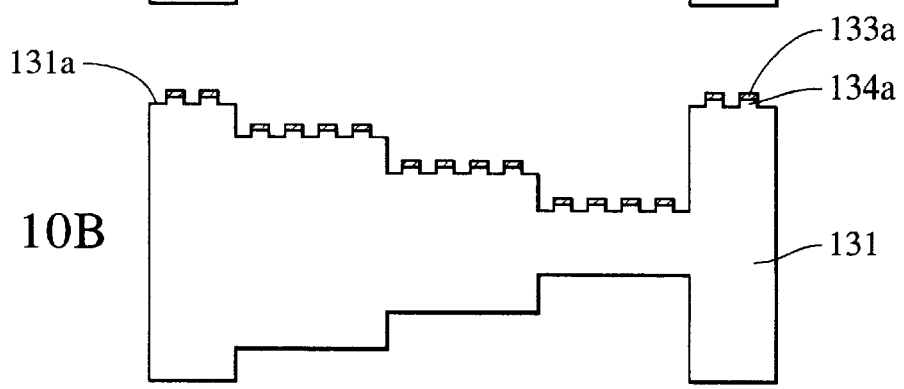
Figure 10C:
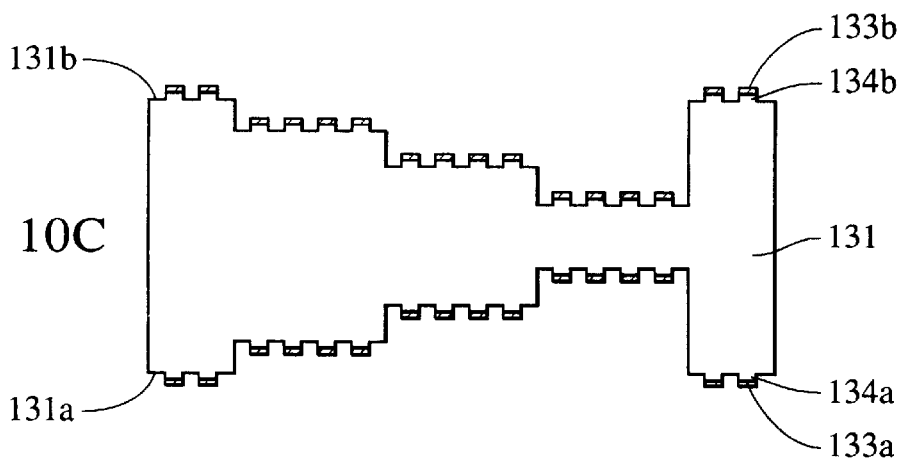
Figure 10D:
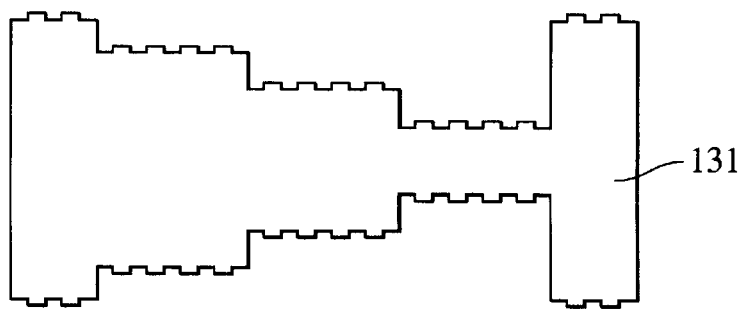

FIG. 9 illustrates a method of forming an antireflection microstructure on the surface of a BOE according to a first embodiment of the present invention. First, as shown in FIG. 9A, the back surface of the BOE 121 made of quartz is covered with a resist film 122. Chromium is then deposited on the BOE 121 by means of electron beam evaporation for 10 sec at a deposition rate of 5 Å/sec at a substrate temperature of 150° C. thereby forming an island structure 124 with an island size of about 50 nm and an island-to-island distance of about 80 nm. Using the island structure 124 as a mask, the BOE 121 is then etched to a depth of 55 nm using an etchant consisting of a 40% HF:$NH_4F$ aqueous solution:2% $AgNO_3$:30% $H_2O$:$H_2O$=1:1: 1:1:9, thereby forming a pillar-shaped microstructure as shown in FIG. 9B.

Thereafter, the island structure 124 used as the mask is removed by means of wet etching using, as an etchant, a mixture of cerium ammonium nitrate, perchloric acid, and $H_2O$. The resist film 122 on the back surface of the BOE 121 is then removed using a resist remover. The microstructure obtained via the above process has antireflection capability which suppresses reflection to a level of 1% or less for a wavelength of 248 nm. A conventional antireflection film may be formed on the back surface of the BOE 121. The optical element on which the antireflection film is formed is not limited to the BOE 121. A similar antireflection film may also be formed on other optical elements such as a lens, a prism, a mask, and a diffraction grating. Furthermore, the material of the BOE 121 is not limited to quartz. The BOE 121 may also be made of glass, $CaF_2$, or other similar materials.

FIG. 10 is a schematic diagram illustrating a method of forming an antireflection structure on both surfaces of a BOE, according to a second embodiment of the present invention. First, as shown in FIG. 10A, aluminum is deposited on one surface of a BOE 131 by means of ion beam assisted evaporation for 5 sec at a deposition rate of 5 Å/sec at room temperature thereby forming an island structure 133a with an island size of about 15 nm and an island-to-island distance of about 40 nm. Using the island structure 133a as a mask, the BOE 131 is then etched to a depth of 40 nm by means of RIE using a $CHF_3$-based gas as an etching gas thereby forming pillar-shaped microstructure 134a as shown in FIG. 10B. Thereafter, as shown in FIG. 10C, an island structure 133 is also formed on the back surface, 131, and a pillar-shaped microstructure 134b is formed using the island structure 133b as a mask, in a similar manner as described above with reference to FIGS. 10A and 10B. The island structures 133a and 133b, formed on surfaces of the BOE 131 and used as the masks, are removed by means of etching using a mixture of $H_3PO_4$, $HNO_3$, $CH_3COOH$, and $H_2O$. The microstructures 134a and 134b obtained via the above process have antireflection capability which suppress reflection to a level of 1% or less for a wavelength of 193 nm.

Figure 11:
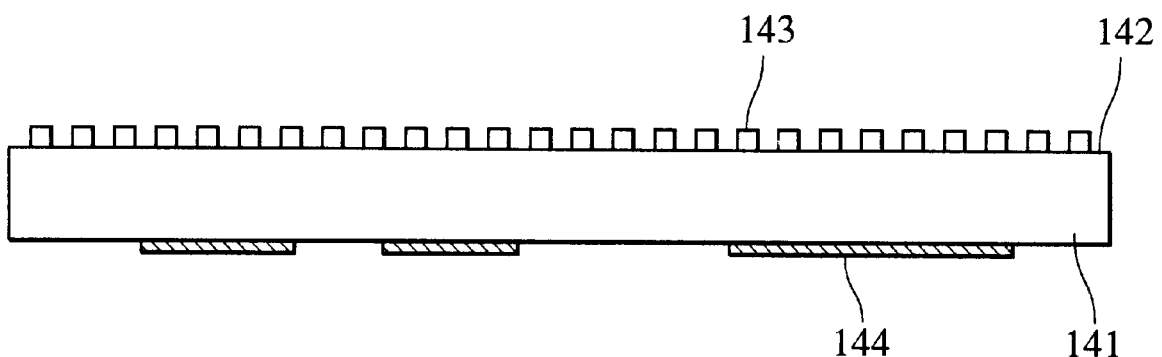
FIG. 11 is a cross-sectional view illustrating a mask having an antireflection microstructure formed on its surface according to a third embodiment of the present invention.

FIG. 11 is a cross-sectional view illustrating a mask 141 having an antireflection structure for use with an exposure apparatus, according to a third embodiment of the present invention. An antireflection microstructure 143 is formed on a glass surface of the mask 141 using a similar method to the first or second embodiment described above. The island height, the period and the shape of the microstructure 143 may be determined depending on the wavelength $\lambda$ of exposure light used in the exposure apparatus. A light blocking pattern 144 is formed on the lower surface of the mask 141. An antireflection microstructure may also be formed on the other surface of the mask 141, if desired.

FIG. 12 is a schematic diagram illustrating a method of forming an antireflection microstructure according to a fourth embodiment of the present invention. First, a BOE 151 made of quartz is covered with a resist film 152 as shown in FIG. 12A. A part 152a of the resist film 152 lying in an area 151a of the BOE 151 where the step size is equal to or less than about 1 $\mu$m is removed by means of exposure and development. An island structure 153 of chromium is then formed in the exposed area 151a of the BOE 151 by means of electron beam evaporation in a similar manner to the first embodiment described above. The BOE in the area 151a is then etched to a depth of 40 nm using the island structure 153 as a mask thereby forming a pillar-shaped microstructure 154. The island structure 153 is then removed using an etchant similar to that employed in the first embodiment, and the remaining resist film 152b is removed so that the BOE in an area 151b is exposed as shown in FIG. 12C.

Figure 12A:
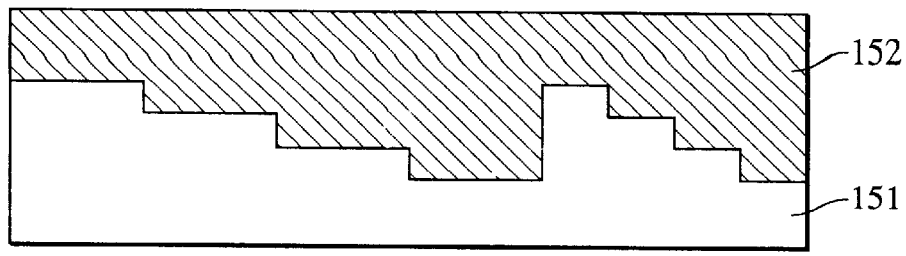
FIG. 12 is a schematic diagram illustrating a method of forming an antireflection microstructure according to a fourth embodiment of the present invention.
Figure 12B:
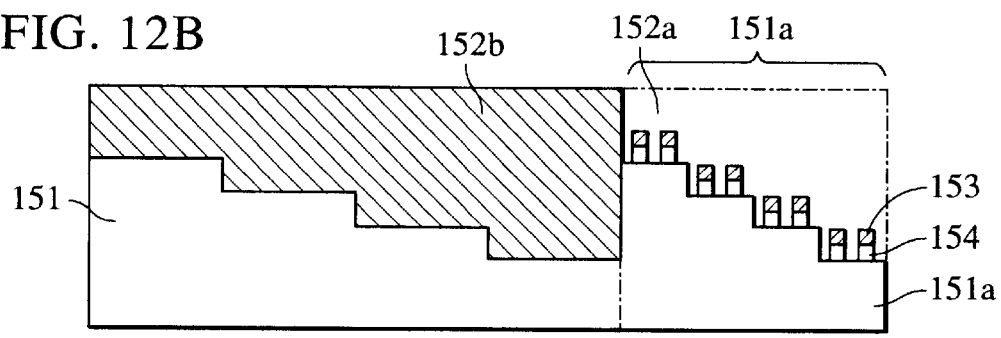
Figure 12C:
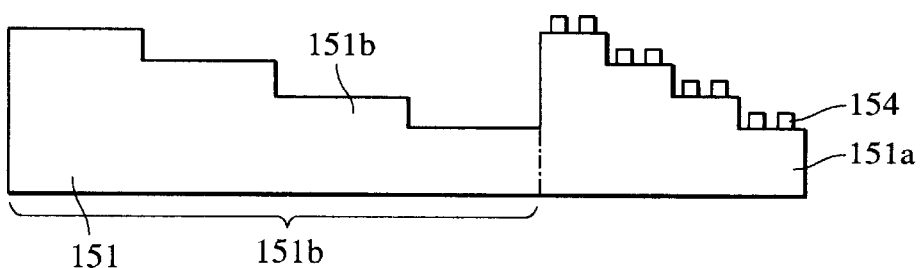
Figure 12D:
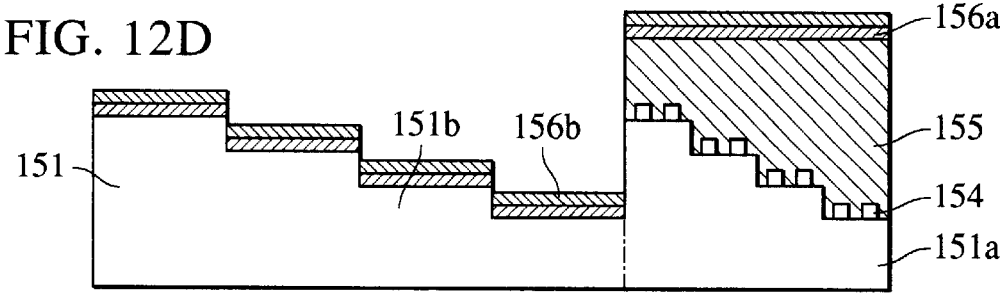
Figure 12E:
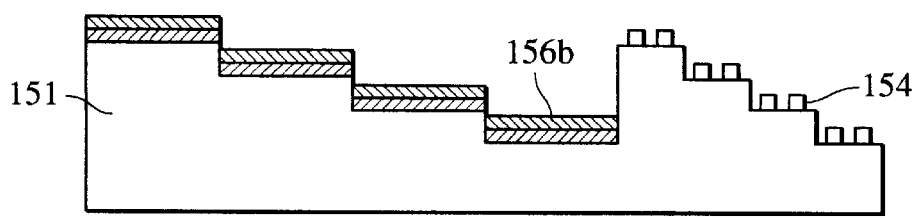

Thereafter, as shown in FIG. 12D, a resist film 155 is coated on the microstructure 154. Using a sputtering technique, conventional antireflection films 156a and 156b consisting of $SiO_2$ and $Al_2O_3$ are formed on the resist film 155 and the BOE in the area 151b, respectively. Finally, as shown in FIG. 12E, the resist film 155 and the antireflection film 156a are removed. Thus, the antireflection microstructure 154 is formed on the BOE in the area 151a where the conventional antireflection film would not function well because the size of each step formed on the surface of the BOE 151 serving as a diffractive element is as small as 1 $\mu$m or less, and the conventional antireflection film 156 is formed on the BOE in the area 151b where the conventional antireflection film 156 can provide good antireflection capability. The resultant BOE 151 has antireflection capability with a reflectance of 1% or less for incident light with a wavelength, $\lambda$, of 248 nm. Although no antireflection film is formed on the back surface in the present embodiment, a conventional antireflection film may be formed on the back surface of the BOE 151.

Figure 13:
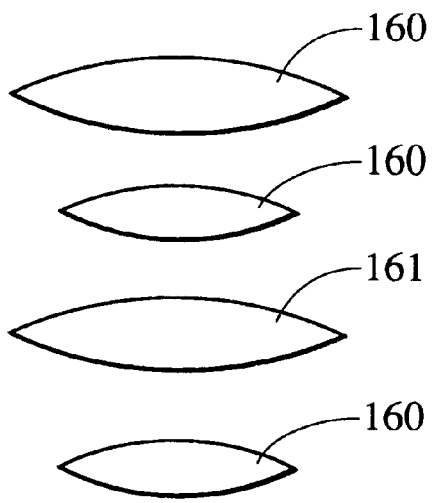
FIG. 13 is a schematic diagram illustrating an optical projection system.

FIG. 13 is a schematic diagram of an optical projection system having a BOE according to one of the first to fourth embodiments. The BOE 161 serves to compensate, in cooperation with conventional lenses 162, for various aberrations of the optical system. A conventional antireflection film is coated on the surface of each conventional lens 162.

This optical projection system may be used in various applications including various types of cameras, an interchangeable lens attached to a single-lens reflex camera, various business machines such as a copying machine, a projection exposure apparatus for use in production of a liquid crystal panel, and a projection exposure apparatus for use in production of a semiconductor device such as an LSI.

Figure 14:
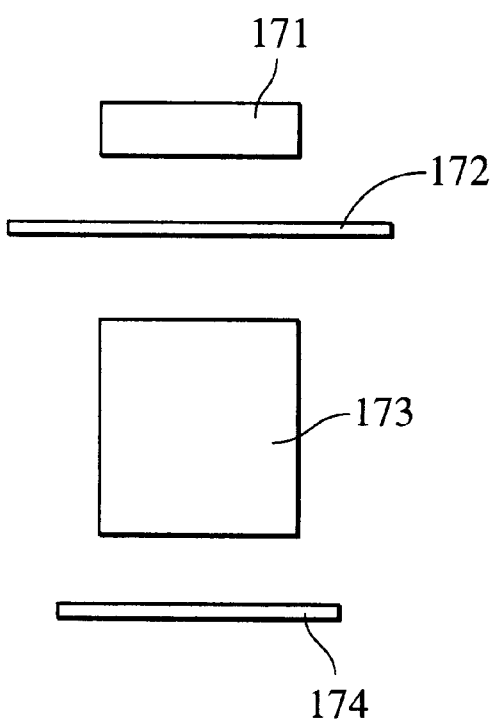
FIG. 14 is a schematic diagram illustrating a projection exposure apparatus.

FIG. 14 is a schematic diagram of a projection exposure apparatus including the above-described optical projection system. A light ray serving as an exposure light ray is emitted from an illuminating optical system 171. The exposure light ray is passed through a mask 172 and then focused upon a resist film coated on a glass substrate or a silicon substrate 174 through an optical projection system 173 so that an image of a device pattern written on the mask 172 is formed on the resist film. The optical projection system 173 includes a diffractive optical element realized by a BOE having a microstructure according to one of the first to third embodiments. The illuminating optical system 171 also includes a similar diffractive optical element according to one of the first to fourth embodiments. Furthermore, an antireflection microstructure is formed on the mask 172. Conventional lenses used in the illuminating optical system 171 and the optical projection system 173 are coated with a conventional antireflection film.

Figure 15:
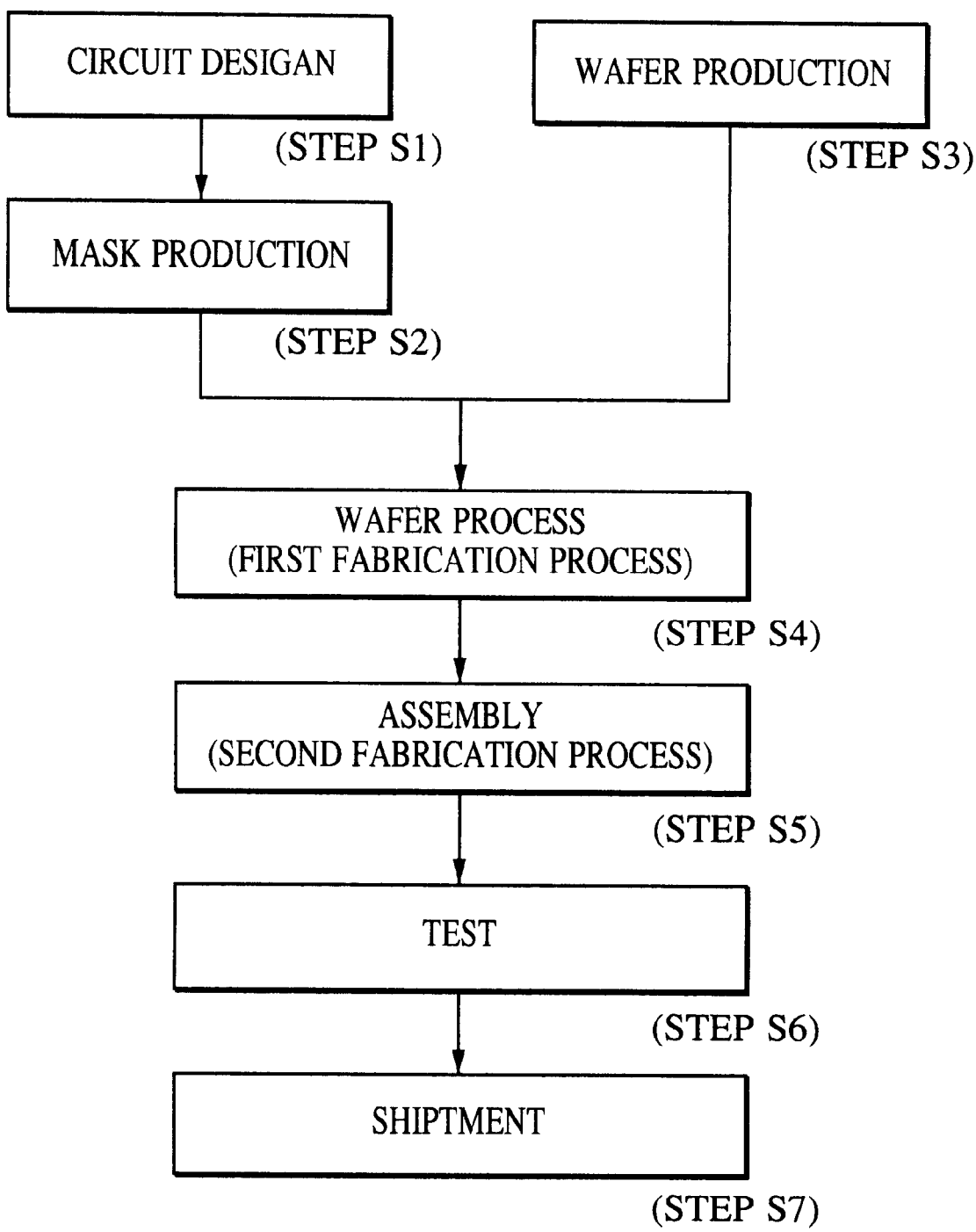
FIG. 15 is a flow chart illustrating a process of producing a semiconductor device.

FIG. 15 is a flowchart illustrating a process of producing a semiconductor device such as an integrated circuit, an LSI, a semiconductor chip, a liquid crystal panel, or a CCD. First in step S1, the circuit of a semiconductor device is designed.

Then in step S2, a circuit pattern designed in step S1 is formed on a mask using an electron beam lithography technique.

Thereafter, in step S3, a wafer is produced using a material such as silicon. Then in step S4 called a wafer process or a first fabrication process, a circuit is produced on the wafer produced in step S3 by means of a lithography technique using the mask produced in step S2.

Thereafter in step S5 called an assembling process or a second fabrication process, the wafer obtained in step S4 is divided into chips and assembled into a packaged form via dicing, bonding, and molding processes. The resultant semiconductor devices are then subjected to an operation test and a reliability test in step S6. After completion of a series of steps described above, semiconductor devices are shipped in step S7.

Figure 16:
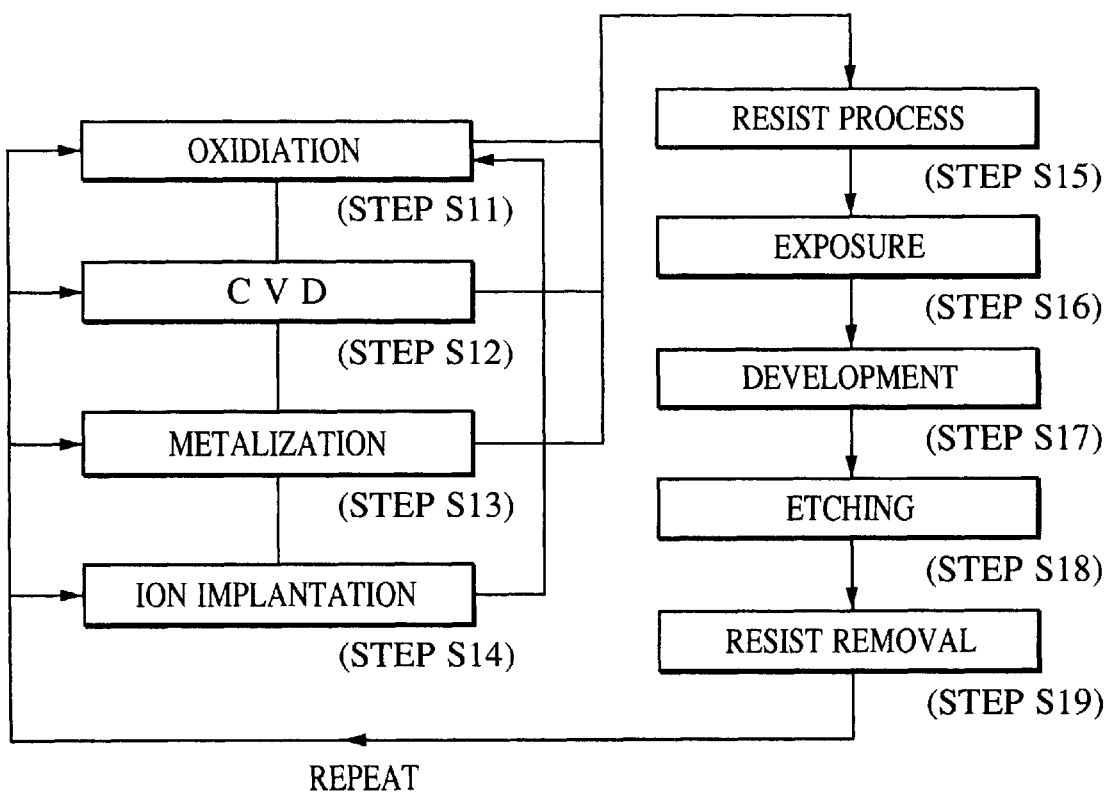
FIG. 16 is a flow chart illustrating in detail a process of producing a wafer.
Figure 17A:
FIG. 17A is a cross-sectional view of a blazed diffractive optical element.
Figure 17B:
FIG. 17B is a cross-sectional view of a binary optical element.
Figure 18:
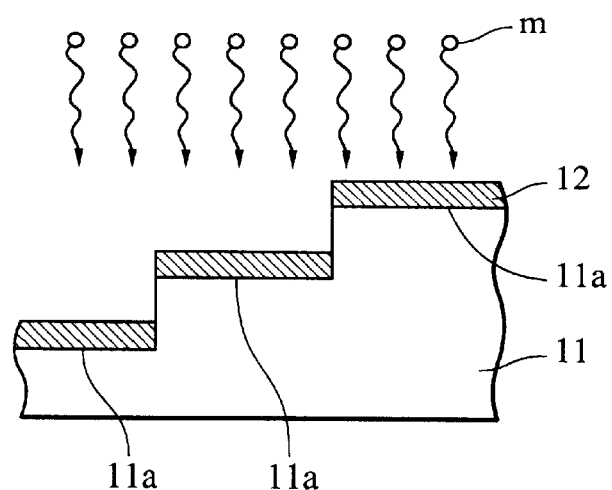
FIG. 18 is a schematic diagram illustrating a conventional method of forming a microstructure.
Figure 19A:
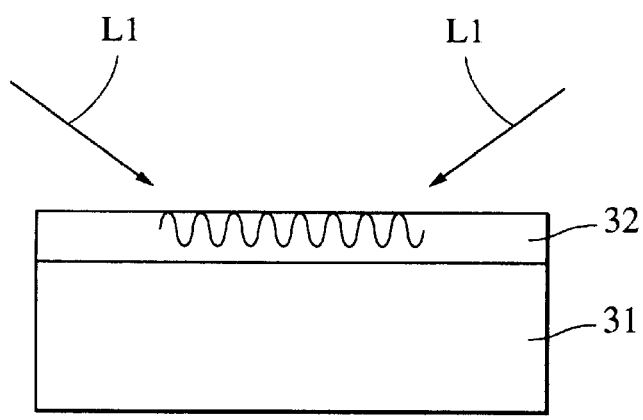
FIG. 19 is a schematic diagram illustrating another conventional method of forming a microstructure.
Figure 19B:
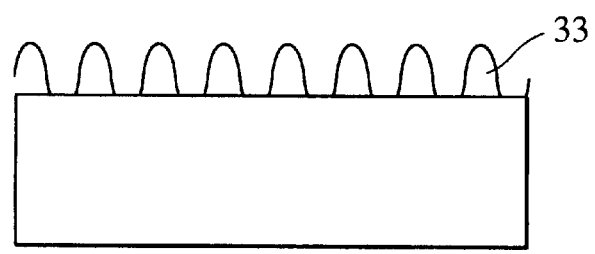
Figure 20A:
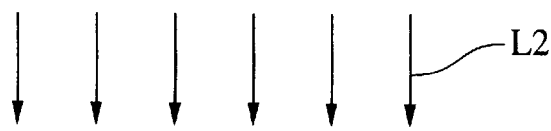
FIG. 20 is a schematic diagram illustrating still another conventional method of forming a microstructure.
Figure 20A:
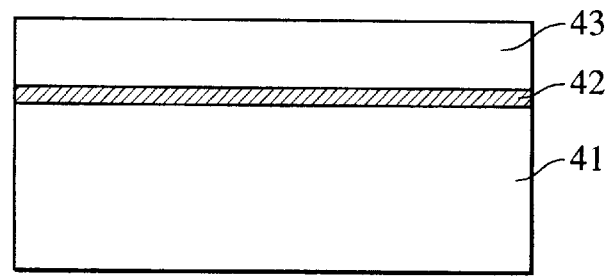
Figure 20B:
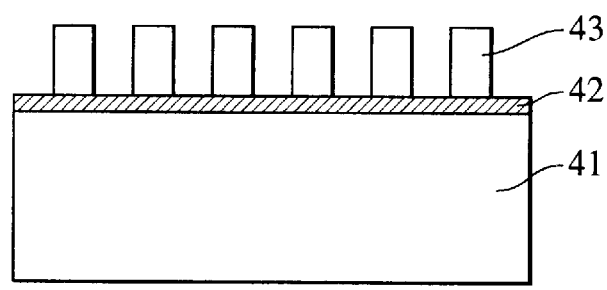
Figure 20C:
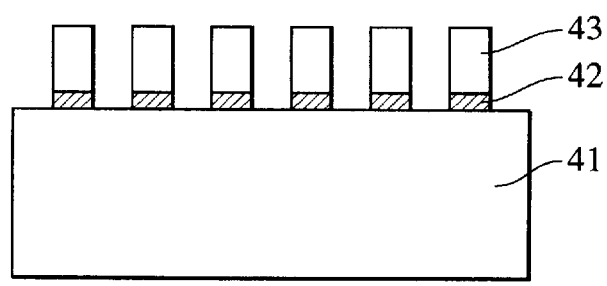
Figure 20D:
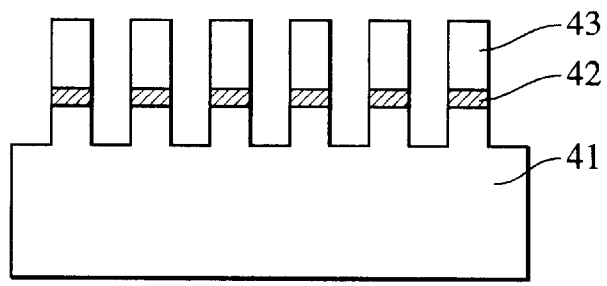
Figure 20E:
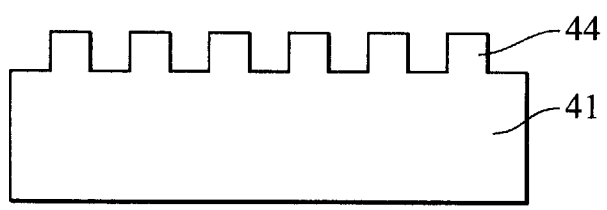
Figure 21:
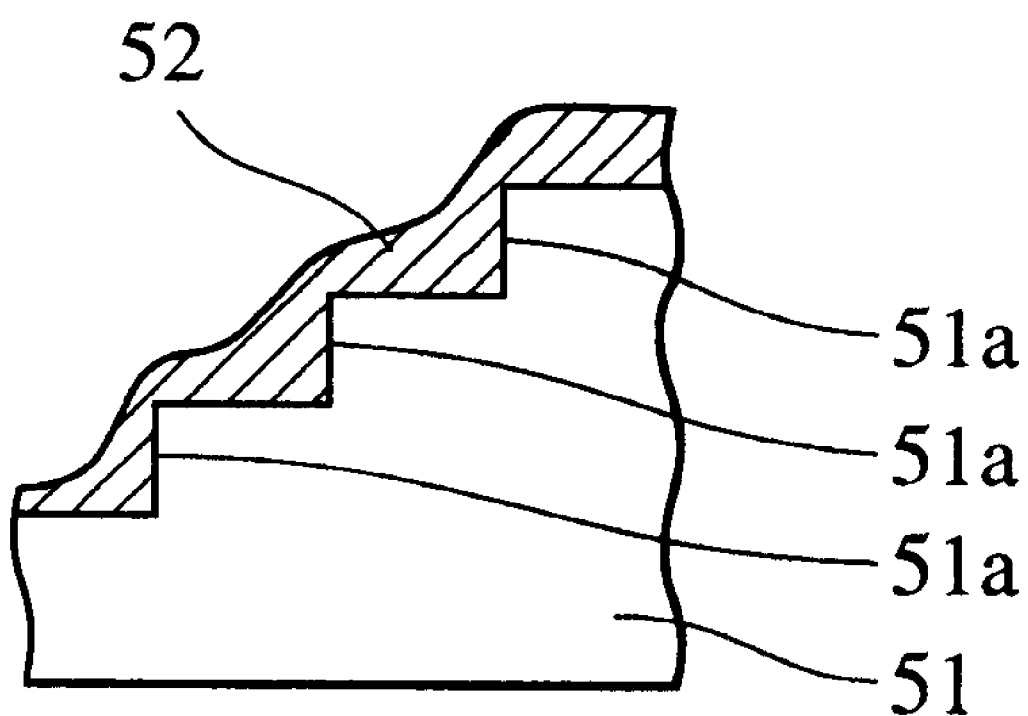
FIG. 21 is a schematic diagram illustrating a BOE having an antireflection film formed by the method shown in FIG. 18.

FIG. 16 is a flow chart illustrating in further detail the wafer process in step S4 shown in FIG. 15. First, in step S11, the surface of the wafer is oxidized. Then in step S12, an insulating film is formed on the surface of the wafer by means of CVD. In step S13, an electrode is formed by means of evaporation. Then instep S14, ions are implanted into the wafer. Thereafter, in step S15, a photoresist film is coated on the surface. In step S16, a latent image of a circuit pattern formed on a mask is formed in the photoresist using a semiconductor exposure apparatus.

After the exposure process in step S16, the photoresist coated on the wafer is developed in step S17. In step S18, parts of the wafer exposed via the resist pattern developed in step S17 are etched. In step S19, the photoresist, which is now unnecessary after completion of the etching process, is removed. These steps described above are repeated so as to form circuit patterns in a plurality of layers on the wafer.

The above-described embodiments according to the present invention may be modified as follows.

(a) The method of forming an island structure serving as a mask is not limited to the electron beam evaporation and the ion beam assisted evaporation. Other evaporation techniques, CVD, laser abrasion, and other film forming techniques may also be employed.

(b) The material of a substrate may be properly selected depending on the specific application. Quartz or Si may be used for transmissive optical elements, and Si may be used for reflective optical elements. In the case of reflective optical elements, a reflection enhancement layer is formed in accordance with the present invention.

(c) The material of an island structure serving as a mask is not limited to those described above with reference to the specific embodiments. Metals, metals oxides, metal nitrides, metal carbides, and other materials may also be employed.

(d) The island size and the island-to-island distance of an island structure can be controlled by properly selecting the material of a substrate, the material of a film, the film forming method, the film forming time, the substrate temperature during the film forming process, and other factors, depending on the specific application.

(e) The combination of the material of the substrate and the material of the film should be selected so that a sufficiently high ratio is obtained between the etching rate for the substrate material which is etched in the etching process and the etching rate for the mask material.

(f) The shape of a microstructure formed on the surface can be controlled by properly selecting the combination of the substrate material and the film material, and also by properly selecting the etching method, the etching selectivity, and the degree of anisotropy, depending on the specific application.

The methods of forming microstructures and the methods of producing optical elements disclosed above allow a finer microstructure to be formed on the surface of optical elements such as a BOE having a fine step structure thereby preventing reflection at the surface of the optical elements.

What is claimed is:

1. An optical element including both a conventional antireflection film and an antireflection structure formed by (i) forming a mask on a surface of a substrate, said mask including a nucleus or an island structure formed by nucleation in a process in which a thin film is formed; and (ii) forming a microstructure having antireflection capability by etching the surface of said substrate using said mask, wherein both said conventional antireflection film and said antireflection structure are formed on the same single substrate.

2. A projection optical system including an optical element according to claim 1.

3. An optical device including an optical projection system according to claim 2.

4. An exposure apparatus including a projection optical system according to claim 2.

5. A method of producing a device, comprising the steps of:

exposing a substrate using an exposure apparatus according to claim 4 so as to form a latent device pattern on the substrate; and developing said substrate.

6. An illuminating optical system including an optical element according to claim 1.

7. An optical device including an illuminating optical system according to claim 6.

8. An exposure apparatus including an illuminating optical system according to claim 6.

9. A method of producing a device, comprising the steps of:

exposing a substrate using an exposure apparatus according to claim 8 so as to form a latent device pattern on the substrate; and developing said substrate.

10. An optical element according to claim 1, wherein said conventional antireflection film is formed on a portion of the substrate that does not have said antireflection structure.

11. An optical element according to claim 10, wherein said substrate has a stepped structure, and said antireflection structure is formed on the substrate in an area where a size of the step is small.

12. A method of producing an optical element, comprising the steps of:

forming a mask on a surface of a substrate, said mask including a nucleus or an island structure formed via nucleation in a process in which a thin film is formed; and forming a microstructure having reflection enhancement capability by etching the surface of said substrate via said mask.

13. A method of producing an optical element, according to claim 12, wherein said substrate is made of Si.

14. A method of producing an optical element according to claim 12, wherein said substrate is a mirror, a mask, or a reflection diffractive element.

15. A method of producing an optical element, according to claim 12, wherein said microstructure formed on the surface of said substrate functions at wavelengths equal to or less than 300 nm.

16. An optical element comprising both a conventional reflection enhancement film and a reflection enhancement structure formed by the method according to claim 12, wherein both said conventional reflection enhancement film and said reflection enhancement structure are formed on the same single substrate.

17. An optical element according to claim 10, wherein said conventional reflection enhancement film is formed on a portion of the substrate that does not have said reflection enhancement structure.

18. An optical element according to claim 17, wherein said substrate has a stepped structure, and said reflection enhancement structure is formed on the substrate in an area where a size of the step is small.

* * * * *

UNITED STATES PATENT AND TRADEMARK OFFICE
CERTIFICATE OF CORRECTION

| | | |
|---|---|---|
| PATENT NO. | : 6,514,674 B1 | Page 1 of 1 |
| APPLICATION NO. | : 09/521380 | |
| DATED | : February 4, 2003 | |
| INVENTOR(S) | : Yuichi Iwasaki | |

It is certified that error appears in the above-identified patent and that said Letters Patent is hereby corrected as shown below:

SHEET 1

FIG. 2, "ASORPTION" should read --ADSORPTION--.

SHEET 10

FIG. 15, "DESIGAN" should read --DESIGN--.

COLUMN 4

Line 31, "coalesces" should read --coalesce--.

COLUMN 5

Line 13, "$n_s$" should read --$n_s$,--; and
    Line 22, "be" should be deleted.

COLUMN 6

Line 60, "133" should read --133b--; and "surface, 131," should read --surface 131b,--.

COLUMN 10

Line 42, "claim 10," should read --claim 16,--.

Signed and Sealed this

Twenty-second Day of January, 2008

JON W. DUDAS
*Director of the United States Patent and Trademark Office*